United States Patent [19]

Porembski

[11] Patent Number: 4,623,511
[45] Date of Patent: Nov. 18, 1986

[54] PUSH-PULL EXHAUST VENTILATION SYSTEM FOR NUCLEAR COMPONENT STORAGE AND REFUELING CANALS

[75] Inventor: Thaddeus T. Porembski, Jacksonville, Fla.

[73] Assignee: Westinghouse Electric Corp., Pittsburgh, Pa.

[21] Appl. No.: 604,555

[22] Filed: Apr. 26, 1984

[51] Int. Cl.⁴ .............................................. G21C 19/00
[52] U.S. Cl. .................................. 376/272; 376/250; 376/310; 376/316
[58] Field of Search ................ 376/310, 316, 250, 272

[56] References Cited

U.S. PATENT DOCUMENTS 3,015,617  1/1962  Brunings ............................. 376/310
3,041,134  6/1962  Weeks ................................. 376/310

Primary Examiner—Donald P. Walsh
Attorney, Agent, or Firm—Daniel C. Abeles

[57] ABSTRACT

A ventilation system for a storage or transfer canal for radioactive materials comprises a series of air emitting nozzles spaced along one side of and above the upper surface of the canal to produce an air curtain completely covering the surface of the canal, and a series of exhaust hood openings on the opposite side of the canal to capture and exhaust the air in the air curtain and a part of the air above the air curtain.

10 Claims, 4 Drawing Figures

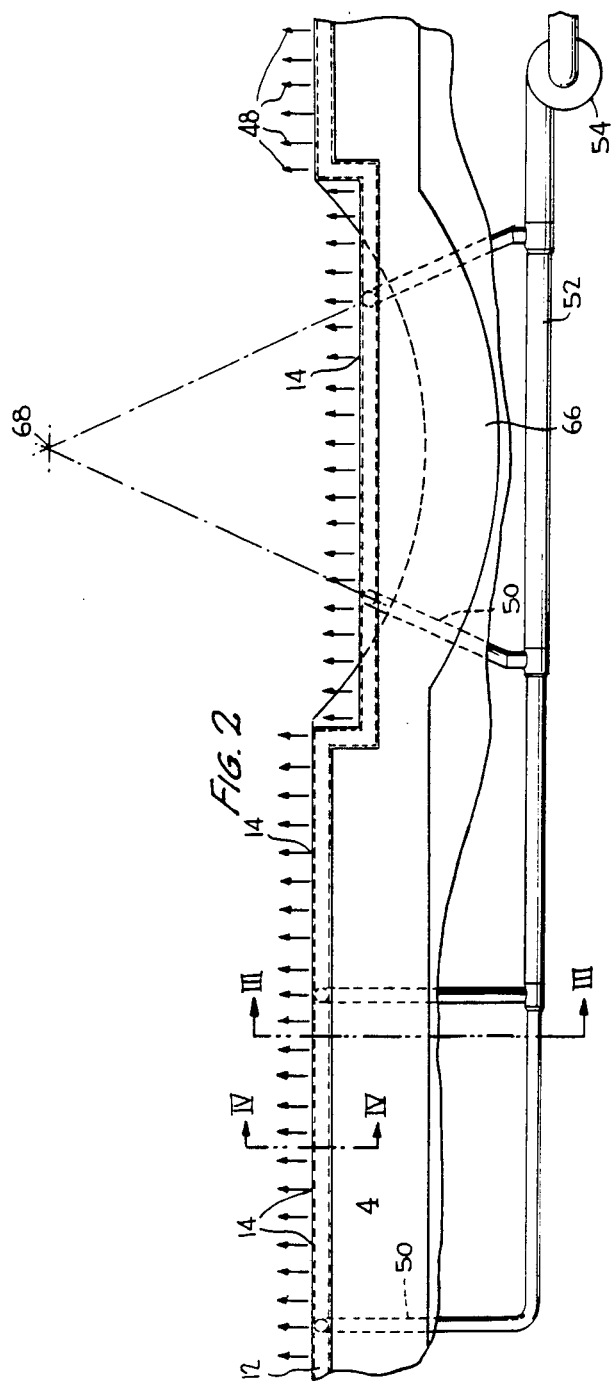

PUSH-PULL EXHAUST VENTILATION SYSTEM FOR NUCLEAR COMPONENT STORAGE AND REFUELING CANALS

BACKGROUND OF THE INVENTION

1. Field of the Invention

This invention relates to exhaust systems for nuclear reactor installations, and more particularly to such exhaust systems used for ventilation of reactor containment refueling canals for the purpose of capturing, for processing, gases and vapors which may be emitted from the surface of the refueling canal, and to prevent the release of radioactive gases to the containment during refueling as a result of a burst of gas which might result in the unlikely event of a dropped fuel assembly or leaky fuel.

2. Description of the Prior Art

Nuclear reactors, particularly nuclear reactors designed and utilized as electric power generating plants, are generally enclosed within a containment. Such reactor installations are also provided with fuel handling and storage facilities, which are often located in separate, adjacent buildings. Reactors, such as pressurized water reactors, generally utilize as a part of the installation a canal filled with water, which is located at one end over the reactor vessel, through which nuclear fuel elements are transported under water to and from the reactor and the separate fuel handling building. During refueling, used fuel elements are removed from the reactor and new fuel elements are inserted into the reactor core. The provision of the canal within and between the containment and fuel handling building allows the fuel elements to be handled under water for cooling and shielding of radioactivity from the fuel elements to the surrounding atmosphere and the operators. However, in the unlikely event a fuel element is dropped within the canal and its integrity is breached to the extent to permit the release of radioactive gases normally contained within the fuel element, or for other reasons a release of radioactive gases should occur, it is desirable to contain such radioactive gases as may be emitted from the surface of the refueling canal in order to prevent possible radioactive contamination within the containment or fuel handling building. Therefore, a system is desired to completely purge the surface above the refueling canal in the containment and fuel handling building to prevent such release of radioactive gases. The normal exhaust arrangements for reactor purge systems are not designed to handle such a contingency.

It is an object of the instant invention to provide an exhaust system to capture radioactive gases which may be emitted from the surface of the refueling canal during refueling.

It is a further object of this invention to provide such a system which captures the gases for processing before they can spread within occupancy areas.

It is a still further object of the invention to provide a system for the prevention of moisture buildup within the atmosphere due to evaporation of water from the refueling canal.

BRIEF SUMMARY OF THE INVENTION

To address the above objectives this invention provides a push-pull exhaust system comprising an air moving blower ducted to a plurality of air jets or nozzles arranged in spaced relationship along the upper wall portion, or edge, on one side of the canal, which direct high velocity air over the top surface of the water to produce an air curtain thereover. The nozzle or jet system may be constructed of a continuous duct adjacent the upper edge of one side of the canal, having a plurality of nozzles spaced along the duct and directed at substantially right angles from the wall across the surface of the water in the canal toward the opposite wall thereof. At the opposite wall, toward which the high velocity air is directed, is provided an exhaust duct system including a hooded opening adjacent the upper edge of the canal wall facing the nozzles. This exhaust duct system is connected to an exhaust fan system for drawing off the air received through the openings. The push-pull system is designed to produce a low flow, high velocity blow of air from the nozzles and a relatively low volume exhaust through the exhaust duct system. The nozzle spacing and air velocity produce an air curtain which captures any gases and vapors as they rise from the surface of the water. In one embodiment of this invention, the total volume of the air within the air curtain reaching the exhaust hooding may be approximately thirty times the volume of air discharged from the nozzles. This increase in volume reaching the exhaust part of the system is due to the entrainment in the moving air curtain of air above the air curtain. Also in such embodiment, the exhaust rate at the exhaust hooding may be approximately two times the air volume reaching the hooding. This difference assures that all of the captured gases and vapors are removed by the exhaust hooding and system. The position of the nozzles and exhaust hooding is predetermined to be a proper distance above the surface of the water so that the action of the air curtain does not cause any water surface disturbance. The air blowing nozzles may be adjustable in the vertical plane and the nozzle holes may be tapered for sound attenuation. The air blowing nozzle box, or duct work, may also serve the additional purpose of a curb adjacent the upper edge of the canal wall. Supply of air for the push-pull system is from the containment.

BRIEF DESCRIPTION OF THE DRAWINGS

The invention will now be described in greater detail with reference to the accompanying drawings wherein:

FIG. 2 is a schematic top plan view of the refueling canal of FIG. 1;

DETAILED DESCRIPTION

Figure 1:
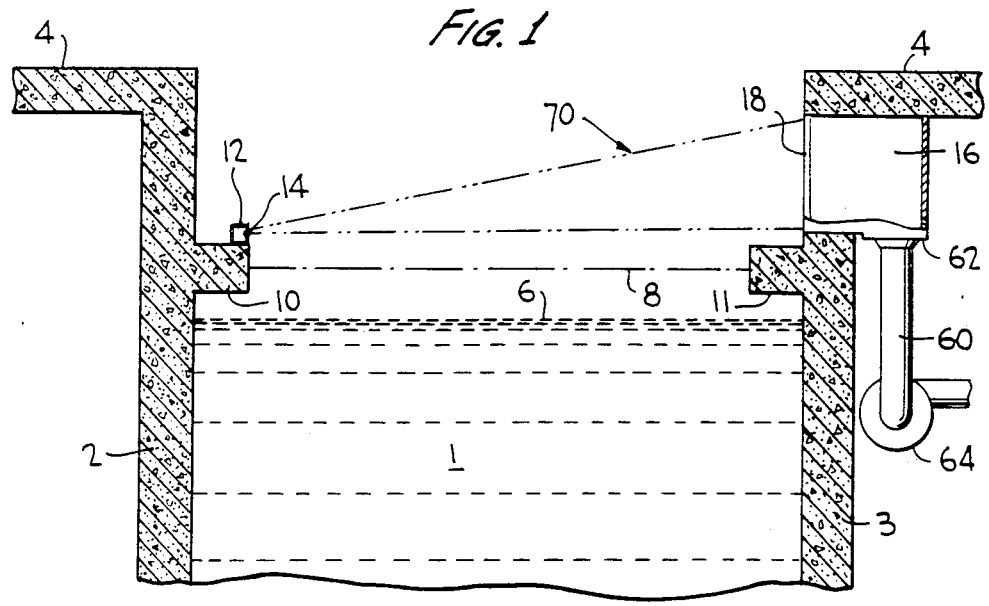
FIG. 1 is a schematic typical cross-section view of a refueling canal showing the push-pull ventilation system of the invention.

FIGS. 1 and 2 show schematically the general layout of a refueling canal with the push-pull exhaust ventilating system of the invention incorporated at the upper portion thereof. The canal is shown generally at 1 and has side walls 2 and 3 generally vertically oriented which support at their upper ends the edge of the canal upper level, which may be the floor 4 (at the plant operating level). Only the upper part of the canal is shown, the low normal water level being indicated at 6 and the high normal water level at 8. Nuclear fuel elements (not shown) are stored in the lower part of the canal at a depth which provides the required radiation shielding.

Near the top of each side wall of the canal is a ledge 10, 11 extending horizontally towards the canal. Along the outer edge of ledge 10 there extends a tubular conduit 12 having a plurality of nozzles shown generally at 14, mounted in spaced relationship in the wall of the conduit facing the canal, (as better shown in FIG. 4) with their outlets directed over the surface of the water and generally in the direction of the opposite side of the canal which has mounted therein near the top an exhaust, or collecting hood, duct 16 having an open entrance face 18 substantially co-planar with the vertically extending inner surface of the upper portion of the side wall between ledge 11 and floor 4.

Figure 4:
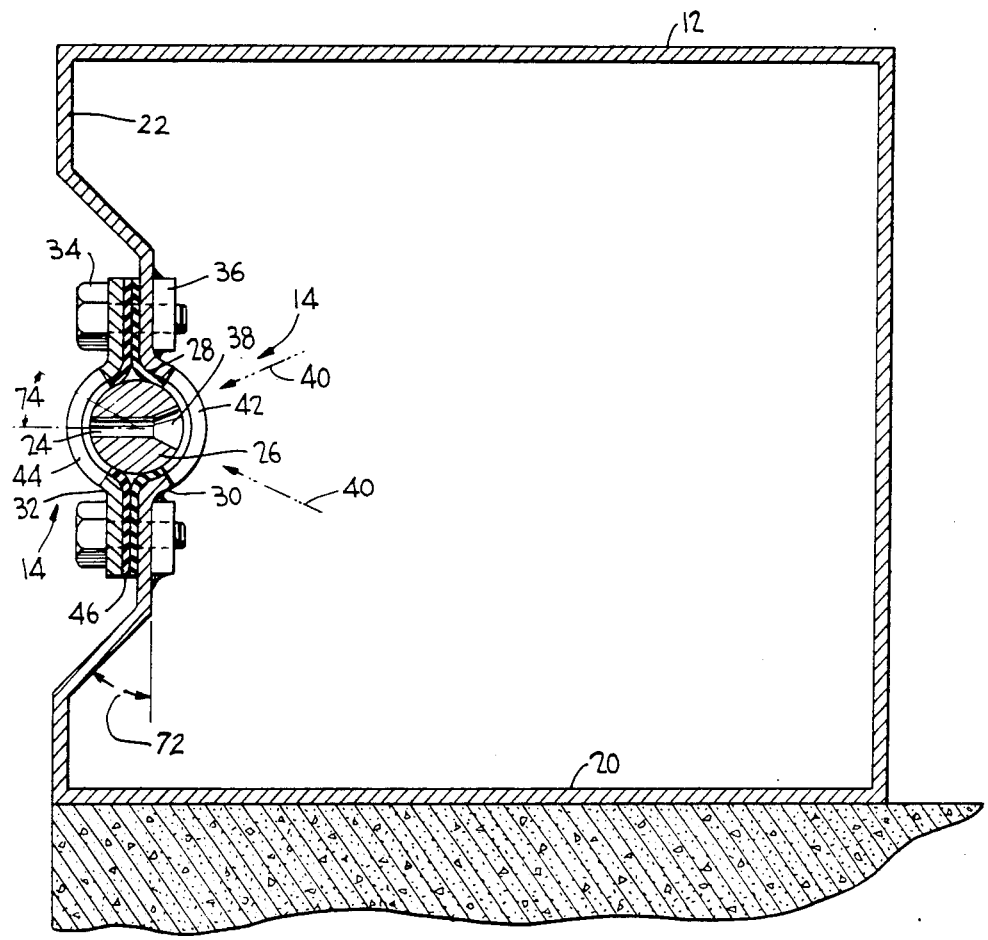
FIG. 4 is a cross-sectional view on an enlarged scale taken along line IV—IV of FIG. 2 showing an embodiment of a nozzle and the nozzle air duct.

Nozzle conduit 12 may be made of metal and have a substantially square, or rectangular, cross-section having the bottom wall 20 attached to the top surface of the ledge by any acceptable means such as lag bolts. As shown in FIG. 4, the side wall 22 of the nozzle duct facing the canal is offset inwardly at the vented portion and each nozzle is mounted in the offset portion. The nozzles are preferably comprised of bores 24 drilled diametrically through a cylindrical shaft 26 which is mounted in a substantially conforming cylindrical opening 28 formed by a curved section 30 in the offset portion of wall 22 and a curved section of a retainer clamp 32 attached to wall 22 by bolts 34 threadedly engaging nuts 36 fixed to the inside surface of wall 22 such as by welding, for example. The inner end of each nozzle bore 24 is conically tapered as shown at 38 to form an entrance for air flow from inside the nozzle duct 12 as shown by arrows 40. An aperture 42 is provided in the curved portion 30 of wall 22 surrounding each nozzle entrance and a similar aperture 44 is provided surrounding each nozzle exit, these apertures allowing rotation of the nozzles through approximately 60° for vertical adjustment of the direction of the air jets over the water surface of the canal. This adjustment should be approximately 30° above a horizontal line through the central axis of the nozzle bore. To facilitate this adjustment, the nozzle shafts 26 are rotatable about the longitudinal axis of the shaft. Gaskets 46 are provided between retainer clamps 32 and curved portion 30 of wall 22 and surrounding nozzle shaft 26, corresponding apertures being provided therein at the entrance and exit ends of the nozzle bores. The desired angle of the jets is set by rotating the nozzle shaft prior to tightening retainer clamp bolts 34 after which the direction of the air jets is fixed. The nozzle shaft may be continuous for any desired length, or may be a series of shafts separately or integrally adjustable to control the direction of the air jets, in order to form a series of spaced air jets over the canal as shown by arrows 48 in FIG. 2.

Figure 3:
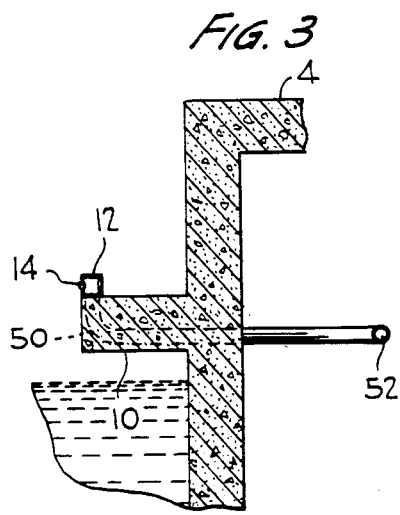
FIG. 3 is a schematic cross-sectional view on an enlarged scale taken alone line III—III of FIG. 2.

Nozzle duct 12 is connected by suitable means through the lower face 20 thereof at spaced intervals to air feed conduits 50, shown schematically in FIGS. 2 and 3, which extend through canal side wall 2 and ledge 10. These conduits 50 are connected to inlet manifold 52 which provides the pressurized air from a source such as pump or fan 54.

Collecting duct 16 has a generally rectangular cross-sectional shape and may be substantially continuous along the canal, the only interruptions in the face 18 being spaced supporting columns for the floor 4 at the canal edge. This duct can also be a series of sections manifolded at their outlets and having their inlet faces arranged to form a substantially continuous inlet opening at 18.

The duct 16, FIG. 1, is preferably made of metal, such as stainless steel. Exhaust duct, or ducts, 60 are connected at one end 62 to collecting hood 16 and at the other end to an exhaust fan, 64, these being of a size to conduct the required flow of air to effectively prevent escape of gases evolving from the surface of the canal.

The curved section of the canal wall 66 as shown in FIG. 2, which is also provided for the opposite wall (not shown), in which the collecting duct is installed, is in the area adjacent the reactor having a generally cylindrical shaped containment vessel (not shown) submerged under water, the approximate centerline being shown at 68. It can be seen that the array of jet nozzles extends continuously and completely across the top of the water over the reactor as well as the canal which adjoins the reactor area. During the refueling operation the top of the reactor well is exposed to the upper compartment by removal of the cavity hatch covers.

During refueling air under pressure is fed through conduits 52, 50, 12 to the nozzles 14 and issues through the jet openings thereof to produce an air curtain, schematically indicated at 70 in FIG. 1, over the surface of the water in the canal and over the reactor in the direction of the collecting ducts 16. The total volume of the air within the air curtain reaching the collecting duct should be approximately thirty (30) times the volume of air discharged from the nozzles. This increase in volume is due to the entrainment of the air above the air curtain within the air curtain as it flows toward and into the collecting duct 16. The exhaust rate at the collecting duct, or hooding, should be approximately twice the air volume reaching this duct, which assures that all of the captured gases and vapors are removed by the exhaust hooding and system. Additionally, the system provides for the removal of moisture buildup, including tritium, due to evaporation of water from the refueling canal.

In a preferred embodiment of the invention, the nozzle duct may be stainless steel approximately six inches square in cross-section, having the nozzles installed centrally in the inner canal side 22 which is offset approximately 9/16 inches inwardly, the angle 72 being 45°. The angle of adjustment 74 of the nozzles is 30°, measured from the centerline of the jet opening and the cone angle of the entrance portion 38 of each nozzle is 60° having the wider diameter of ⅜ inches. The conduits 50 are 5 to 6 inches in diameter and conduits 52 are 5 to 9 inches in diameter. The nozzles are spaced on approximately 1¾ inch centers and are of a size to produce a jet velocity of 7600 feet per minute. The blow is about 550 CFM and the exhaust is about 32,500 CFM, the increase being due to entrained air as discussed above. Suitable filters are provided in the exhaust system to filter out radioactivity.

I claim:

1. A ventilation system for nuclear installations having a water filled canal for storage or transport of radioactive components under water comprising:
   a plurality of air nozzles positioned above the surface of the water and directed across said surface;
   a manifold conduit connected to said nozzles and to air feed means;
   at least one collecting hood having a plurality of openings therein positioned above said surface and spaced from said nozzles;
   said openings in said hood substantially facing said canal;

means to feed air under pressure to said nozzles to produce a blast of air through said nozzles across said canal surface;

means to exhaust air through said hood openings to collect air above said surface and at least part of the air from said nozzles;

an exhaust duct connected to said hood openings and to said air exhaust means; and said nozzles and said hood openings being positioned along opposite sides of said canal, said nozzles being substantially horizontally aligned, and said openings being substantially horizontally aligned.

2. A ventilation system as claimed in claim 1 wherein:

said manifold conduit comprises a substantially horizontally extending conduit mounted on one side of said canal; and said nozzles are mounted in a side of said conduit facing said canal.

3. A ventilation system as claimed in claim 2 wherein said exhaust duct is mounted in the other side of said canal; and said hood openings are mounted in the side of said duct facing said canal.

4. A ventilation system as claimed in claim 2 wherein each nozzle comprises:

a cylindrical shaft member rotatably mounted in said side of the conduit facing the canal;

a bore hole extending through said shaft;

an inlet aperture through said side of the conduit communicating the inner end of said bore with the inside of said conduit;

a clamping member removably attached to said side and adapted to clamp said nozzle shaft to said side;

and an outlet aperture through said clamping member communicating with the outer end of said nozzle bore.

5. A ventilation system as claimed in claim 4 wherein:

said nozzle conduit has a rectangular cross-section;

said side facing said canal is substantially vertical, and is provided with a partially cylindrical portion at least at said nozzle substantially conforming to said nozzle shaft to receive part of said nozzle shaft therein;

said clamping member has a partly cylindrical portion at each nozzle which is the mirror image of said partly cylindrical portion of said vertical side wall so that said nozzle shaft is clamped therebetween;

resilient gasket means is provided between said nozzle shaft and said vertical side wall and clamping member;

and apertures are provided through said gasket means conforming to said apertures in said vertical side wall and clamping member.

6. A ventilation system as claimed in claim 2 wherein:

the inner end of said nozzle bore is conically tapered to provide a gradually reducing inlet for said nozzle bore.

7. A ventilation system as claimed in claim 6 wherein:

said nozzle conduit extends continuously along said canal;

and a plurality of nozzles are uniformly spaced along said conduit so that they produce an air curtain completely covering the surface of the canal.

8. A ventilation system as claimed in claim 7 wherein:

said exhaust duct extends continuously along said canal;

and a plurality of hood openings are uniformly spaced along said duct;

the size of said hood openings and duct and flow of air through said hood openings being predetermined to produce an intake through said hood openings sufficient to entrain all the air in said air curtain and part of the air above said air curtain.

9. A ventilation system as claimed in claim 1 wherein:

said nozzle conduit extends continuously along said canal;

and a plurality of nozzles are uniformly spaced along said conduit so that they produce an air curtain completely covering the surface of the canal.

10. A ventilation system as claimed in claim 9 wherein:

said exhaust duct extends continuously along said canal;

and a plurality of hood openings are uniformly spaced along said duct;

the size of said hood openings and duct and flow of air through said hood openings being predetermined to produce an intake through said hood openings sufficient to entrain all the air in said air curtain and part of the air above said air curtain.

* * * * *